United States Patent
Foster, III

(10) Patent No.: US 9,516,395 B2
(45) Date of Patent: Dec. 6, 2016

(54) SYSTEMS AND METHODS FOR SENSOR SYNCHRONIZATION

(71) Applicant: Electronic Warfare Associates, Inc., Herndon, VA (US)

(72) Inventor: Lester Anderson Foster, III, Frederick, MD (US)

(73) Assignee: ELECTRONIC WARFARE ASSOCIATES, INC., Herndon, VA (US)

( * ) Notice: Subject to any disclaimer, the term of this patent is extended or adjusted under 35 U.S.C. 154(b) by 14 days.

(21) Appl. No.: 14/663,340

(22) Filed: Mar. 19, 2015

(65) Prior Publication Data

US 2015/0281809 A1    Oct. 1, 2015

Related U.S. Application Data

(60) Provisional application No. 61/972,147, filed on Mar. 28, 2014.

(51) Int. Cl.
*H04Q 9/00* (2006.01)

(52) U.S. Cl.
CPC ..................... *H04Q 9/00* (2013.01)

(58) Field of Classification Search
CPC ............ H04Q 9/00; G01S 5/28; H04J 3/0667; H04J 3/0697; H04R 1/406; H04R 3/005; Y10S 367/906
See application file for complete search history.

(56) References Cited

U.S. PATENT DOCUMENTS

| | | | |
|---|---|---|---|
| 6,243,657 B1 * | 6/2001 | Tuck | G01N 29/2412 324/207.13 |
| 7,688,802 B2 | 3/2010 | Gonia et al. | |
| 7,899,936 B2 | 3/2011 | Fredriksson et al. | |
| 8,189,494 B2 | 5/2012 | Budampati et al. | |
| 8,249,616 B2 | 8/2012 | Boejer et al. | |
| 8,279,896 B2 | 10/2012 | Etkin et al. | |
| 8,767,898 B2 | 7/2014 | Verhaegen et al. | |
| 8,805,376 B2 | 8/2014 | Boejer et al. | |
| 2004/0246059 A1 * | 12/2004 | Varsamis | H03L 1/02 331/176 |
| 2006/0069939 A1 | 3/2006 | Fredriksson et al. | |
| 2007/0159924 A1 * | 7/2007 | Vook | G01S 5/28 367/127 |
| 2009/0054075 A1 | 2/2009 | Boejer et al. | |
| 2009/0290511 A1 | 11/2009 | Budampati et al. | |
| 2009/0290572 A1 | 11/2009 | Gonia et al. | |
| 2011/0216658 A1 | 9/2011 | Etkin et al. | |
| 2012/0099687 A1 | 4/2012 | Verhaegen et al. | |
| 2013/0035099 A1 | 2/2013 | Boejer et al. | |
| 2014/0040653 A1 * | 2/2014 | Etkin | G06F 1/12 713/500 |

OTHER PUBLICATIONS

Written Opinion of International Search Authority and International Search Report dated Jun. 29, 2015.

* cited by examiner

*Primary Examiner* — Sisay Yacob
(74) *Attorney, Agent, or Firm* — DLA Piper LLP (US)

(57) ABSTRACT

A sensor system may comprise a sensor, an oscillator, a receiver, a processor, and a data interface. The sensor may be configured to detect an environmental condition and produce a sensor signal in response. The receiver may receive a signal comprising a time reference having a first frequency. The oscillator may be configured to produce a precision time reference signal having a second frequency that is higher than the first frequency. The processor may be configured to generate a time stamp using a combination of the time reference and the precision time reference signal and package data from the sensor signal with the time stamp. The data interface may be configured to transmit the packaged data over a network.

47 Claims, 6 Drawing Sheets

TSSP Array and Support Node with Wireless Connection to Controlling Processor Platform

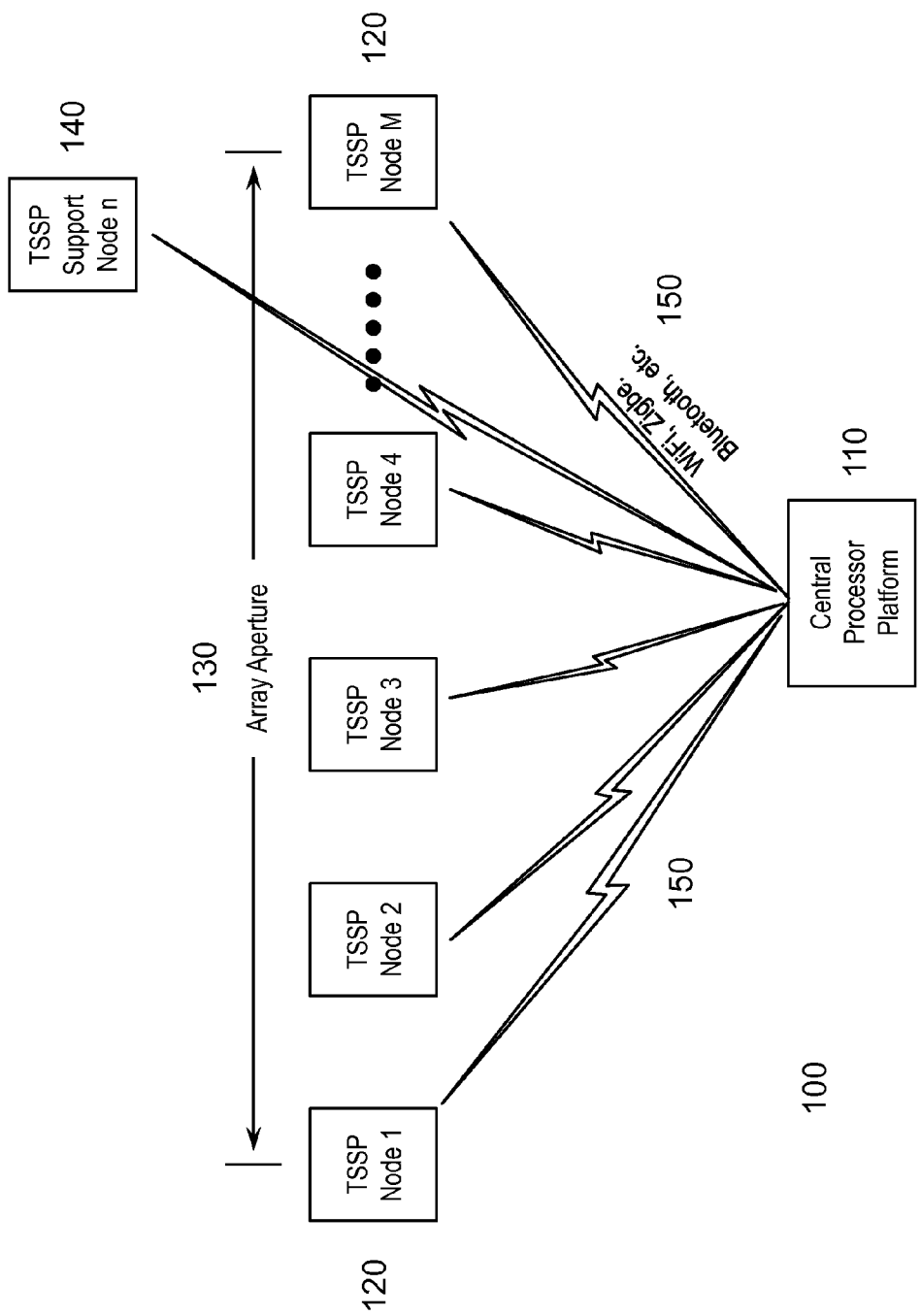
Figure 1. TSSP Array and Support Node with Wireless Connection to Controlling Processor Platform

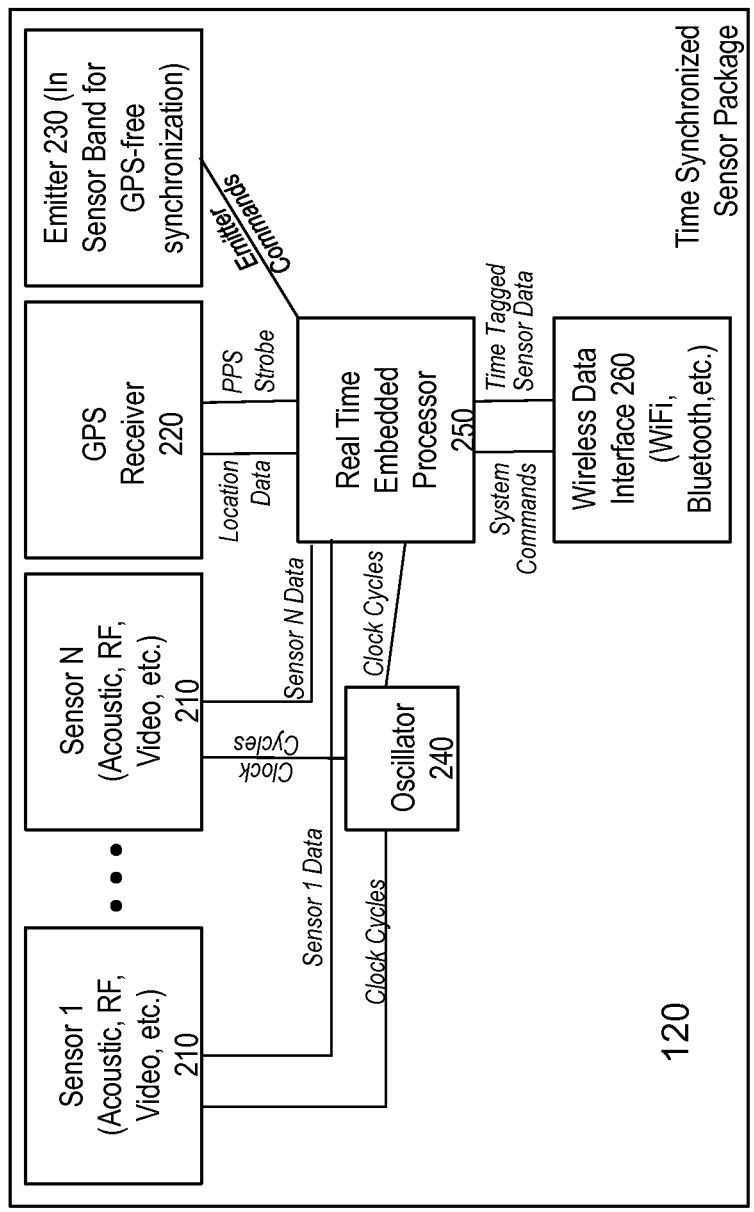
Figure 2. Time Synchronized Sensor Package Block Diagram

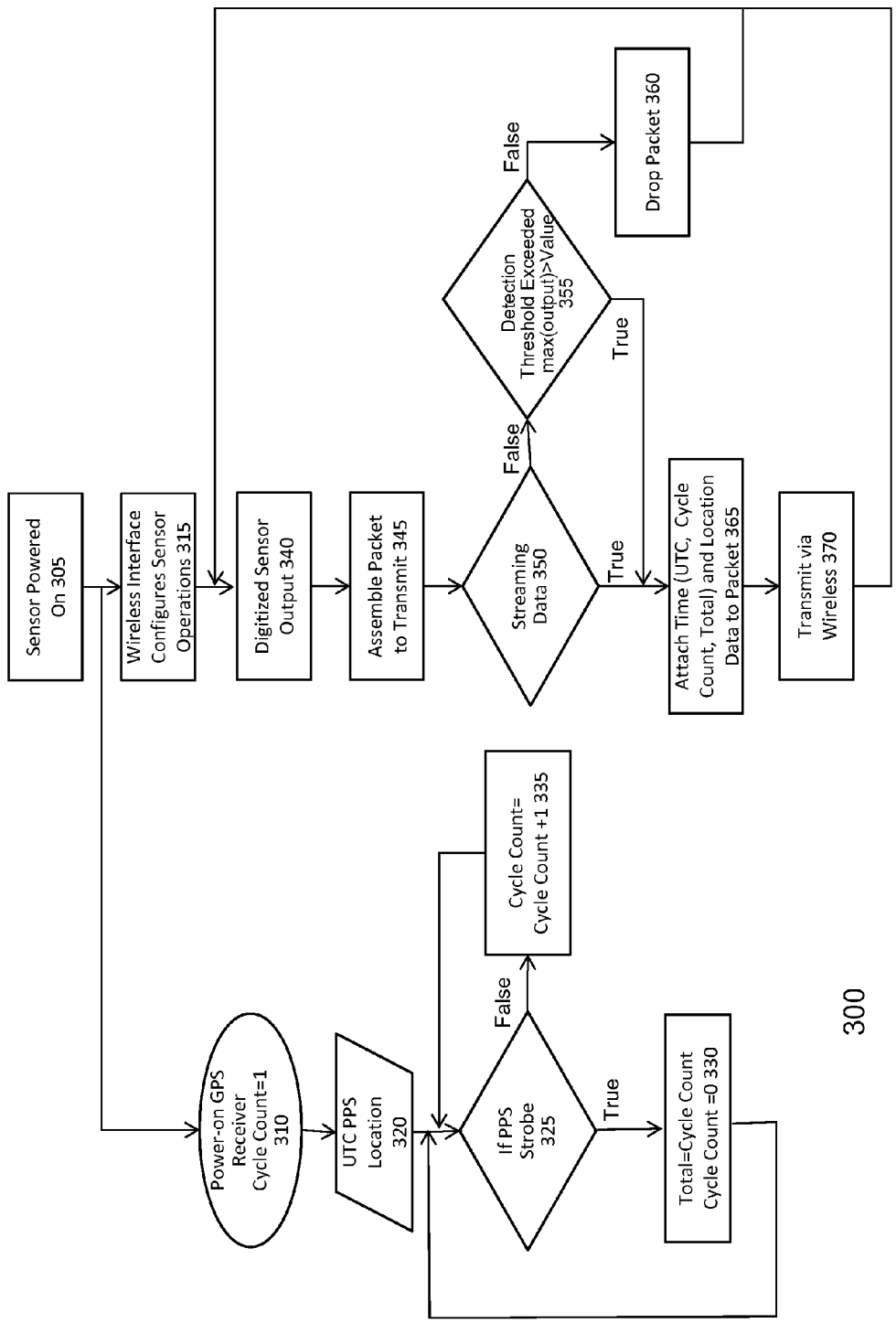
Figure 3. Sensor Processing When TSSP Nodes Have Access to GPS

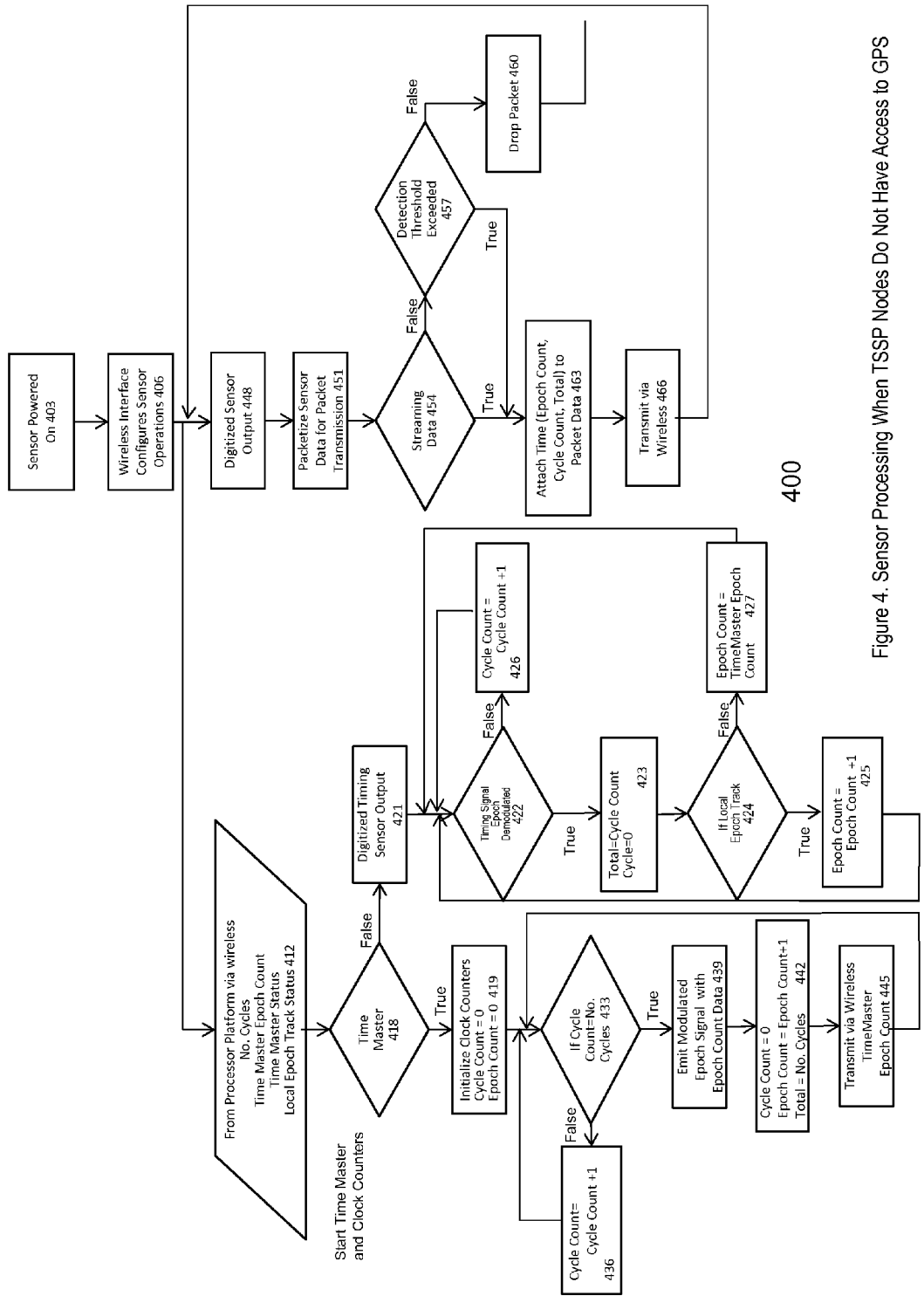
Figure 4. Sensor Processing When TSSP Nodes Do Not Have Access to GPS

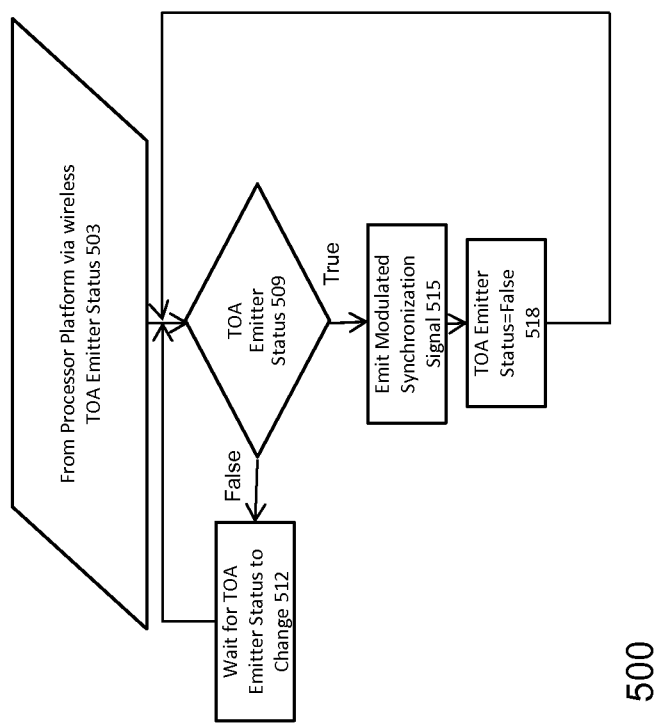
Figure 5. Calibration of Time Offsets for Operations without Access to GPS using Time of Arrival

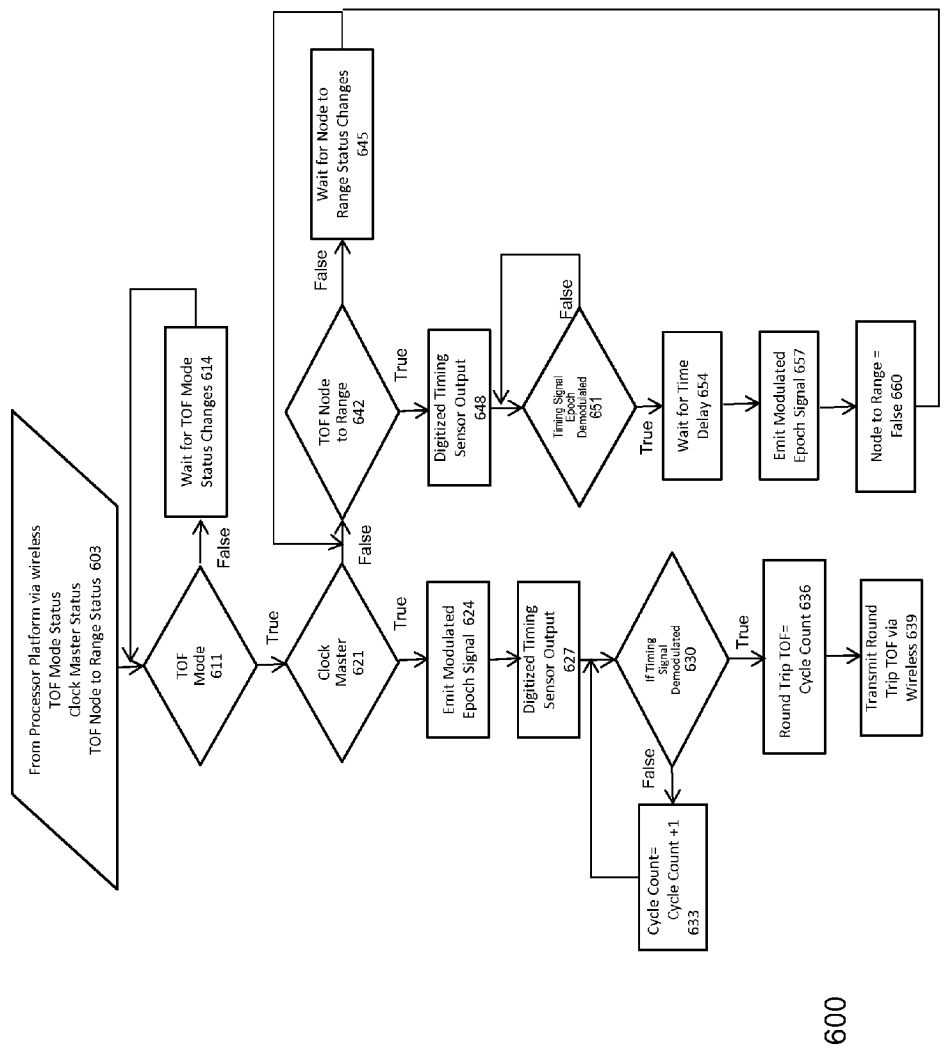
Figure 6. Calibration of Time Offsets between Nodes using Round Trip Time of Flight for Operations without Access to GPS

SYSTEMS AND METHODS FOR SENSOR SYNCHRONIZATION

CROSS-REFERENCE TO RELATED APPLICATIONS

This application is based on and derives the benefit of U.S. Provisional Patent Application No. 61/972,147, filed on Mar. 28, 2014. The entirety of the above-listed Application is incorporated herein by reference.

BRIEF DESCRIPTION OF THE DRAWINGS

FIG. 1 is a sensor system according to an embodiment of the invention.

FIG. 2 is a sensor package according to an embodiment of the invention.

FIG. 3 is a sensor processing method according to an embodiment of the invention.

FIG. 4 is a sensor processing method according to an embodiment of the invention.

FIG. 5 is a time of arrival offset calibration method according to an embodiment of the invention.

FIG. 6 is a time of flight offset calibration method according to an embodiment of the invention.

DETAILED DESCRIPTION OF SEVERAL EMBODIMENTS

A time synchronized sensor package (TSSP) may be a sensor pod that may tag sensor data with precision time measurements. Multiple TSSP sensor pods may link their precision time tagged sensor measurements to a processor platform (smartphone, tablet computer, laptop, etc.) via the platform's wireless interfaces (for example including Bluetooth, Zigbe or IEEE 802.11 (Wi-Fi)). The TSSP may expand the number and types of sensors available to the processor platform and may increase the capabilities of the processor platform. The TSSP may provide an ability to synchronize the remote sensor pod data with a common time and location reference. Thus, the processor platform may perform coherent processing with the sensor data in an array to expand the volume of space the sensors monitor and/or improve sensor detection resolution with the capability of the array configuration. The sensor outputs may also be compared in a common time standard to correlate data with high relative temporal resolution.

Processor platforms described herein may comprise one or more computers. A computer may be any programmable machine or combination of machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. Computers may facilitate communications between users, may provide databases, may perform analysis and/or transformation of data, and/or perform other functions. It will be understood by those of ordinary skill that those terms used herein are interchangeable, and any computer capable of performing the described functions may be used. For example, though the term "smartphone" may appear in the following specification, the disclosed embodiments are not limited to smartphones.

Wireless interfaces may function to provide and/or interact with a network or networks which may link one or more computers. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocol, including connection oriented protocols such as TCP or connectionless protocols such as UDP. Any connection through which at least two computers may exchange data can be the basis of a network.

FIG. 1 is a sensor system 100 according to an embodiment of the invention. The system 100 may include a central processor platform 110, which may be in communication with one or more TSSP nodes 120 via one or more wireless interfaces 150. The TSSP nodes 120 may collectively form an array 130. In some cases, the TSSP nodes 120 may be spaced physically apart from one another. The TSSP nodes 120 may have unique identifiers and may each be configured and controlled by a host central processor platform 110. The central processor platform 110 may also be in communication with one or more TSSP support nodes 140 via one or more wireless interfaces 150. The TSSP support nodes 140 may send data to and/or receive data from the central processor platform 110, but may be separate from the array 130. The TSSP support nodes 140 may perform various functions described below in greater detail. Time synchronization among sensors of the TSSPs 120 in the array 130 may increase the level of sensitivity of the sensor system 100 by coherently combining sensor input so as to increase the signal to noise ratio relative to the individual sensors operating alone or by sensors operating without time synchronization. Time synchronization of sensor data may also enable cross-correlation of data between sensors to provide improved sensor resolution and localization of detected target signatures. The sensors may be wirelessly synchronized by the central processing platform 110 via the wireless connections 150. Together the network of synchronized sensors of the TSSPs 120 may provide a large sensor array with greater aperture, spatial resolution and sensitivity than a single sensor by itself.

FIG. 2 is a TSSP 120 according to an embodiment of the invention. The TSSP 120 may include a real time processor 250 (such as a field programmable gate array or FPGA), a data modem or other wireless data interface 260 (Bluetooth, Wi-Fi, Zigbe, and/or other modem), and a variety of electronic sensors and transducers 210 (examples may include microphones, speakers, radio transceivers, passive infrared detectors, infrared light emitting diodes (LEDs), magnetometers, video cameras, etc.). The sensors 210 may be able to detect environmental conditions, such as sounds, objects, movements, electromagnetic fields, radiation, chemicals, etc. that may exist in the environment in which the TSSP 120 is disposed. In some embodiments, the TSSP 120 may include a global positioning system (GPS) receiver 220. The GPS receiver 220 of an example discussed herein has a 1 pulse per second (PPS) timing strobe pulse output synchronized with the GPS Universal Time Clock (UTC), although GPS receivers 220 with different outputs may also be used. A secondary oscillator 240 (e.g. crystal, temperature compensated, chip scale atomic clock, etc.) or clock may be used to provide higher resolution timing data for time measurement of events between GPS 1 PPS strobes, for example if the GPS receiver 220 does not provide an oscillator output or if a GPS oscillator of the GPS receiver 220 does not provide a desired temporal resolution between PPS strobes. The same secondary oscillator 240 may support synchronization when the GPS receiver 220 is not present or cannot achieve a location solution, for example due to poor reception to the GPS satellite constellation. The secondary oscillator 240 may also be used by the sensors 210 to provide a high resolution time reference and sensor clock function to digitize sensor 210 analog data. The TSSP 120 may also include an emitter 230 which may emit signals which may be detectable by one or more sensors 210. This emitter 230 may be used for TSSP 120 synchronization, for example. As will be described in greater detail below, the processor 250 may receive sensor 210 data, location and strobe data from the GPS receiver 220, emitter commands from the emitter 230, and/or clock cycles from the oscillator 240. The wireless data interface 260 may receive system commands and pass them to the processor 250 and/or receive time tagged sensor data from the processor 250 for transmission. In some embodiments, components of a TSSP 120 may be incorporated into a smartphone. For example, a smartphone may include one or more sensors 210, a GPS receiver 220, processor 250, and/or data interface 260 which may be used to provide a TSSP node 120 within a sensor system 100. Other TSSP 120 components may be connected to the smartphone, such as sensors 210, emitters 230, oscillators 240, processors 250, and/or additional GPS receivers 220 or data interfaces 260.

Returning to FIG. 1, the TSSP nodes 120 may interface with a general purpose processor platform 110 that may allow for software application development and operational flexibility. The central processor platform 110 can be a smartphone, tablet, laptop computer, or any other computer platform with wireless interfaces which may communicate with the TSSP nodes 120. Different wireless interfaces may provide different TSSP node 120 network architectures. The system 100 may include a hub and spoke network as shown in FIG. 1, wherein the platform 110 is the hub and the TSSP nodes 120 are spokes. In some embodiments, such as those using WiFi wireless communications, other network arrangements such as general peer-to-peer network communication architectures may be used.

Each TSSP 120 may operate as a peripheral device of the processor platform 110. Since many commercial processor platforms 110 do not support real-time operation, the TSSPs 120 may not include the central processing platform 110 to coordinate network timing. Also, non-real time operating systems may lack the ability to access a sensor or real time clock through operating system driver access functions with a known time constant. Coherent correlation processing techniques may require sensor output data to be aligned in time to achieve a coherent gain. Precision geolocation of individual post-detection sensor outputs, such as time of arrival of sounds above a threshold or a tracked target's pixels on a video imager, may require precision time measurements among sensors to geolocate sensor signatures with accuracy. As a result, the data from each of the network of sensors in the array 130 may be time tagged to a common precision clock in a real-time, consistent, and repeatable manner. This time tagging of sensor data may be performed by each TSSP's 120 real time embedded processor 250. The TSSP nodes 120 may be wirelessly synchronized to a common clock source. As described below, a variety of methods may be used to synchronize TSSPs 120 in an array 130. The choice of method may depend upon whether GPS satellite service is available, for example.

Network Synchronization with GPS

For TSSP nodes 120 that have access to a GPS satellite constellation, each TSSP node 120 may use its GPS receiver 220 to geolocate the TSSP node 120 automatically without the input of a user. The GPS universal time clock (UTC) may then become the common time reference or network master clock to time tag recorded sensor events. The GPS UTC synchronization may be achieved using a GPS receiver 220 that is capable of providing 1 Pulse Per Second (PPS) strobes, for example. To measure higher resolution time in between the PPS strobes, an oscillator may be used. The oscillator may include a clock counter to count off the oscillator cycles. Some GPS receiver 220 models may provide a clock oscillator output trimmed with a frequency that is frequency locked to the PPS strobes. This GPS clock oscillator can be used inside the processor 250 logic to generate a clock counter to record the GPS oscillator cycles between strobes and measure fine resolution time. It may also be possible to measure fine time resolution between pulses with a secondary oscillator 240 that is external to the GPS receiver 220. The external oscillator 240 may incorporate the frequency control and control logic to frequency lock the external oscillator cycle count to the GPS receiver 220 pulses. However, the secondary oscillator 240 clock need not be frequency locked with the GPS receiver 220 pulses to be able to track precision time with a few parts per million level of accuracy.

Measuring time between PPS strobes may be performed by employing a clock counter to count oscillator cycles between GPS receiver 220 PPS strobes and record the number of clock intervals or cycles over the PPS strobe cycle interval. As a result, time may be registered as a fraction defined by a current clock count divided by a clock count between the previous two GPS receiver 220 PPS strobes. Since GPS receiver 220 PPS strobes are one second apart (or some other known interval apart), high resolution time may be represented as a fraction of a second or known interval part. This approach may provide accurate timing based upon the fact that once a clock oscillator is run continuously over a long period (which may be known as "burning in"), the variance of its output may eventually become a function of temperature and source voltage for stationary oscillators. The voltage and temperature variance rate may have time constants much slower than a one second time duration. Therefore, a clock's drift over time may not vary significantly on a second by second basis. A simple low cost quartz oscillator 240 clock with megahertz (MHz) or greater operation counter frequency, for example, may provide precision to support microsecond level or better time variance between PPS strobes. The GPS receiver 220 strobes may be interpolated with the oscillator 240 clock pulses. The time measurement precision may be a function of the precision between GPS receiver 220 PPS strobes and a clock counter temporal resolution. Relative time between recorded events may use additional GPS UTC time data from a least significant byte or bytes of the GPS UTC to support measurements that bridge across PPS strobes and/or for measuring events that have time horizons longer than the one second.

FIG. 3 is a sensor processing method 300 according to an embodiment of the invention. This method 300 may be used in situations wherein the TSSP nodes 120 have access to the GPS satellite constellation, for example. Upon power activation 305 of TSSP nodes 120, each TSSP node 120 may initiate its real time processor 250 and power up 310 the GPS receiver 220 and secondary clock oscillator 240. The powered up GPS receiver 220 may automatically begin searching for a GPS satellite signal lock. The host processor platform 110 may connect to each TSSP node 120 over a wireless communication interface 150. A user may be able to interact with the processor platform 110, for example through a graphical user interface (GUI), and may make selections of specific TSSP nodes 120 to configure. These selections may be transmitted from the processor platform 110 to the TSSP nodes 120 via the communication interface 150. For example, a user may select a specific sensor or sensors and may configure them to operate in programmed and/or desired modes such as streaming activated sensor data or reporting when a sensor output exceeds a detection threshold. This configuration information may be used to configure sensor operations 315. Once the GPS receiver 220 is locked on the GPS satellite network, it may determine the TSSP node 120 position 320. The TSSP node 120 may report its location to the host processor platform 110 upon this initial determination and/or the location can be relayed with each data packet as described below. Next, with position known, the GPS receiver 220 of the TSSP node 120 may generate PPS strobes synchronized to the GPS UTC 320. At this point, the clock counter may measure the higher resolution time after the second PPS strobe. The clock counter process may run continuously in parallel to all other sensor node processes. The clock counter may operate in real time at a constant cycle rate to increment the clock cycle count 335 until the next UTC increment is initiated by the PPS strobe 325. When a PPS strobe signal from the GPS receiver is initiated, the clock cycle counter may be zeroed and the total cycles may be stored 330 as a reference for precision time measurements to be recorded over the next PPS UTC interval. Precision time may now be measured as a fraction of cycle count per total counted between PPS strobes. In this manner precision time may not require the clock counter oscillator to operate a control loop to adjust a control voltage on the oscillator to steer a common counter frequency among all nodes. The remainder of this figure is directed to generating sensor output time tagged with the GPS synchronized clock, and is discussed in greater detail below.

Network Synchronization without GPS

For TSSP nodes 120 that do not have access to a GPS satellite constellation or otherwise are not using or equipped with GPS, the TSSP nodes 120 may be placed in desired fixed locations with respect to each other having location coordinates that may be measured in a relative local coordinate system. In some embodiments, the location coordinates may be measured by the user. Or, if GPS had been available previously and the TSSP nodes 120 did not move, the previously recorded location coordinates may be used for the TSSP nodes 120. Operation without GPS may utilize a different master clock source for network time from the clock source used in operation with GPS.

Without GPS providing UTC PPS strobes, an oscillator 240 in one of the TSSP nodes 120 in an array 130 may be assigned to provide the master network clock, or a separate TSSP support node 140 not participating in the sensor array 130 may be selected to provide the master network clock strobes. For example, this assignment may be made by a user selection via the central processor platform 110 to one of the TSSP nodes 120 or network support nodes 140 to provide this function, or an assignment may be made automatically. The user may also be able to define a number of internal clock cycles to register a constant epoch or time interval, which may provide a similar function to the GPS UTC PPS synchronization strobe described above. The constant epoch or time interval may be interpolated with oscillator 240 cycle counts to determine a precise high resolution subepoch time measurement. The central processor platform 110 may use a clock master TSSP node 120 to transmit an impulsive signal to establish an epoch cycle as a basis to measure time throughout the array 130. The designated clock master TSSP node 120 may count clock cycles until it reaches a count that defines a time interval for re-synchronization, then the master TSSP node 120 may reset the counter to start from the beginning again. At the end of the time interval, the master TSSP node 120 may generate an impulsive strobe signal which may be broadcast by the emitter 230 to mark the event in a bandwidth of the other TSSP nodes' 120 sensors. The master TSSP node 120 may be selected such that it has the best line of sight or best reception of its synchronization signal between all of the other nodes in the network. Different sensor types 210 may employ different impulsive signal types. The impulsive signal for an audio or acoustic spectrum sensor may be a high bandwidth short acoustic chirp emitted from an acoustic speaker emitter 230, for example. For a radio transceiver, the impulsive signal may be a radio frequency pulse or a phase change event in a radio frequency signal modulation, for example. For an optical detector sensor, the impulsive signal may be a short amplitude modulated pulse in an optical color band, for example.

FIG. 4 is a sensor processing method 400 according to an embodiment of the invention. This method 400 may be used in situations wherein the TSSP nodes 120 do not have access to the GPS satellite constellation or do not include a GPS receiver 220, for example. Upon power activation 403 of TSSP nodes 120, each TSSP node 120 may initiate its real time processor 250. The host processor platform 110 may connect to each TSSP node 120 over a wireless communication interface 150. A user may be able to interact with the processor platform 110, for example through a graphical user interface (GUI) application, and may make selections of specific TSSP nodes 120 to configure. This configuration information may be used to configure sensor operations 406. These configuration selections may be transmitted from the processor platform 110 to the TSSP nodes 120 via the communication interface 150. For example, a user may select a specific sensor or sensors and may configure them to operate in programmed and/or desired modes such as streaming activated sensor data 454 or reporting when a sensor output triggers a detection threshold 457 or event. A TSSP node 120 or support node 140 may also be designated as the time master 418 by the user and may initialize the variables to perform time management for clock counting 412 such as the number of oscillator cycles to define an clock master epoch count 412. If a node is not the time master, then the central processor platform may define the time master epoch count to these network nodes, or, the epoch count may be incremented locally depending upon the local epoch count status assigned true or false 412. If local epoch count is used, then the user application operating on the central processing platform may determine the epoch count offsets from the various TSSP nodes in signal processing during calibration.

If the TSSP node 120 is the TSSP network clock master 418, then it may initialize its clock counters 419. The TSSP node 120 may test to see if its cycle count limit has been reached 433. If not the cycle count may increment 436. When the cycle count reaches a value indicating the passage of a desired time interval (i.e., an epoch) 433, a signal may be communicated 439 to the other TSSP nodes 120 in the array 130 via an impulsive emitter modulation within the bandwidth of the other TSSP nodes sensors. This impulsive emission 439 may announce the end of a reference time interval. In addition to the impulsive timing signal, the time master node may modulate the epoch interval count 439 into the timing signal. Next, the clock cycle counts may be zeroed and the epoch count may be incremented 442 to support time measurements that exceed the cycle count in a similar manner as the GPS UTC. Finally, the TSSP master node may transmit to the central processor unit 110 the epoch count for future signal processing of network signals 445 over the data communication interface 260. With counters incremented, the clock master may start counting the next epoch cycle 433. The epoch interval counter may roll over back to the beginning after exceeding a maximum limit 442.

If the TSSP node 120 is not the master 418, it may wait for the reception of the time master epoch signal via the sensor output 421 sensitive to demodulate or detect the time master epoch signal 422. The TSSP node 120 may increment its oscillator cycle count while waiting to receive the impulsive signal 426. Upon reception of the impulsive signal to be successfully demodulated, clock counters at each TSSP node 120 may be zeroed and total clock cycle count may be collected for this epoch period or time interval 423. The counter total from this interval cycle may be stored or recorded. To measure high resolution time at each TSSP node 120, time may be measured using the current TSSP clock count and then referenced or divided by the counter total from the previous impulse cycle. The absolute precision time at any TSSP node 120 may be measured as this clock counter fraction times the master TSSP node 120 time interval after the last epoch count. If the local epoch tracking is false 424, then the TSSP node 120 may assign the time master epoch count to the number demodulated from the clock master signal or from epoch count data collected over the wireless interface 427. If there is local epoch tracking, then the epoch count for the node 120 or 140 may increment for timing measurements until the epoch count reaches a maximum and rolls over the counter 425.

The data from all TSSP nodes 120 may be aligned in time at the sensor network system level for TSSP operations without GPS. The time measurements at each TSSP node 120 may be slightly delayed from the clock master TSSP node 120 as a result of impulsive signal propagation time through the signal medium between the clock master TSSP node 120 source to each of the TSSP receiving nodes 120. The accuracy of determining the time offset measurements may depend upon, for example, the nature of the impulsive event itself, the time constants of the sensors to register the impulsive event, and the characteristics of the impulsive signal as it propagates through the medium between emitters and sensors impacting the consistency of detection among the different TSSP node 120 sensors. The remainder of this figure is directed to generating sensor output with time tagged data relative to the network time master clock epoch count and higher resolution cycle count, and is discussed in greater detail below.

Determining Offset Time Measurements

After power up and configuration of the sensors, the sensors may collect data. The clock master node may keep all nodes operating at a constant epoch interval rate. The individual clock counters of all network nodes may operate to the master clock epoch cycle or frequency. The TSSP nodes may be calibrated to determine their phase or time offsets through calibration of the network to determine the time offsets of each TSSP node from the master clock node. Calibration may repeat regularly during network operation since the relative clock drifts between TSSP nodes may drift as batteries drain, the environment temperature changes, devices warm-up, etc.

FIG. 5 is a time offset determination method 500 according to an embodiment of the invention. This method 500 is the first of two different, alternative approaches to determine offset time measurements relative to the clock master so that data collection at the TSSP nodes 150 may be synchronized to the common network clock master. This first approach may measure the time of arrival (TOA) at each TSSP node 120 in the array 130 from signals transmitted by one or various TSSP nodes 120 in the array 130 or other TSSP support nodes 140 which may be acting as supporting nodes to the array 130 but may not participate the sensor array 130 itself. If the location of all TSSP nodes 120 and support nodes 140 and the propagation speed of an impulsive signal are known to the central processing platform 110, then an impulsive transmission from a known location (i.e., any TSSP node 120, the support node 140) may have a predetermined or known relative time of arrival (TOA) at each TSSP node 120. When the system 100 is configured to perform this TSSP node 120 clock offset calibration, the central processing platform 110 may configure the functions of any TSSP node 120 or support node 140 by communicating over the wireless medium to set the TOA emitter status 503 to true. Each TSSP node 120 selected to perform the impulsive transmission may evaluate the status 509 in parallel to other processing operations and if true, may emit a signal 515. Once the signal is emitted, the TOA emitter status may be set to false 518 until reconfigured again for future calibration. The processor platform 110 may collect the impulsive signal detection data via the wireless link 150 from the TSSP nodes 120 to align the time of arrival of each TSSP node 120 signal to be consistent with its location relative to the impulsive signal source. To receive these signals, the TSSP nodes may be in their standard data collection mode. The time of arrival may be measured against the time tags of the TSSP node detection times in each TSSP node clock cycle count, total count between epoch signals, and TSSP node epoch count, to determine each node's offset from the master clock given the estimate of time delay from the source to sensor over distance and signal propagation speed. As long as the TSSP nodes 120 do not move, these time offsets may account for source signal propagation time to each TSSP node 120 and may remain consistent for a period of operation of the system 100. These measurements may consider the propagation environment so that first arrival direct path signals are collected, rather than multipath or reflected signals which may distort the timing measurements and offset times. Furthermore, the other nodes in the network may have their TOA emitter status set to true by the central processor platform 110 to determine if the time alignments of signals are consistent between all nodes in the network 130. This time calibration can be repeated over the operation of the network to address oscillator drifts due to temperature and source voltage variations or other issues that may occur over time.

A signal may also be generated at a known location in the bandwidth of a sensor without utilizing a TSSP node 120 or support node 140 as a signal source to align node clock offsets. An example of an impulsive signal in the acoustic band is a hand clap. Optical sensors may utilize a strobe light. The central processing unit 110 may only need to determine the expected sensor reception time for each TSSP node 120 when the impulsive signal is generated at a known location. Then the relative time variances between each TSSP node 120 can be defined relative to the master network clock node 120.

FIG. 6 is a second approach to determine TSSP node 120 time offsets according to an embodiment of the invention. This method 600 may determine TSSP node 120 time offsets by measuring the round trip time of flight (TOF) using an impulsive signal message exchange between the master TSSP node 120 and every other TSSP node 120 in the array 130. In this approach, the central processing unit 110 may configure which individual TSSP nodes 120 will perform impulsive round rip TOF signal exchange with the network clock master TSSP node 120. The process starts with the clock master TSSP node 120 emitting its impulsive signal. When a TSSP node 120 configured to be the selected node to measure time detects the signal, it may respond by emitting an impulsive reply signal. The master TSSP node 120 may detect the reply impulse signal and stop counting the clock time cycles upon the reply detection. A predetermined amount of time may be elapsed before the selected TSSP node 120 emits its response so that the initial time master impulse signal can clear the environment to avoid reflections, echoes, reverberations, and/or other interference. Upon reception, the master TSSP node 120 may transmit the total TSSP network TOF data to the central processing unit 110.

The TOF may contain several components of elapsing time. There may be fixed time delays associated with processor logic communicating with analog components for generation and detection of impulse events. There may also be time delays that result from a TSSP node 120 that is being ranged waiting to respond after receiving an impulsive signal. These processing delays may be fixed and known. The propagation time that occurs from a signal propagating through the medium may be variable and may depend distance between the TSSP nodes 120. For the TOF measurement, the propagation time may be twice the distance from the two-way signal exchange. The one-way path delay may be half the quantity of total TOF less the fixed processing delays. The one-way path measurements may also support the measurements to determine the TSSP node 120 locations when propagation time is multiplied by the signal propagation speed. The central processing platform 110 can perform the TSSP node 120 geolocation processing application using the inter-node ranges between the master and all other TSSP nodes 120 and time of arrival data between TSSP nodes 120 individually selected as emitters and time of arrival at other TSSP nodes 120 in the network. The fixed time delays associated with the TSSP nodes 120 may be determined through experiments of ranging between TSSP nodes 120 at known distances. The experiments may include finding TOA of signals emanating from known locations and determining the fixed delays from the processor logic components. Once these delays are known between the clock master and other TSSP nodes 120, they may be taken into account by the central processing platform signal processing algorithms to align TSSP node 120 data time tags to a common synchronized network clock accurately.

FIG. 6 illustrates the alternative TOF approach. The processor platform 110 may first set up the system 100, for example by setting up the clock master TSSP node 120 and other TSSP nodes 120 in the network 130 to find time offsets. Next the processor platform 110 may configure the mode parameters 603 to initialize the current participating TSSP node 120 for inter-radio time of flight measurement, selecting a TOF operating mode 611, and setting a TSSP node 120 to range 642. Upon sending the TOF mode status to the network clock master node 120, the clock master 621 may begin the interrogation sequence. The impulsive epoch signal may be modulated by the clock master 624, and the sensor may begin its sensor signal processing for reply detection 630. As the sensor waits for a reply, a counter may increment the time count 633. Meanwhile, the selected node to range 642 may be in a state of examining the sensor 648 for a detection of the clock master impulsive signal 651. All other TSSP nodes 120 not set by the processor 110 to perform TOF node to range may all wait until their status to range has been set 645. The selected TSSP node 120 to range may examine its sensor output processing to detect the clock master's pulse 651 and may initiate a delay to insure the impulsive signal from the clock master may reverberate and clear the environment 654 to avoid interference. Next, the selected node may emit a reply epoch signal back 657 and may deselect itself as a TSSP node 120 to range against 660. The clock master, upon detecting a reply impulse, may stop incrementing its clock counter 636 and may record the time in in which the reply impulse was detected. The clock master node 120 may report the round trip TOF data 639 to the processing platform 110 via the wireless service 150. With the total time of flight and the time delays between emission, detection, and wait state known 654, the two way propagation may be determined. The process may repeat between the clock master and all other TSSP nodes 120 in the sensor array 150. One way time of flight between the clock master node and each node may correspond to the offsets of each TSSP node 120 to the common clock.

Sensor Data Collection Operations

During data collection, the TSSP nodes 120 may collect sensor data in finite time increment packets. If a TSSP node 120 is in streaming mode, the sensor increment of data may be tagged with the time data and transmitted to the host processor platform 110. Returning to FIGS. 3-4, the sensor or sensors 210 may generate digitized sensor output data packets 340/448. In the method 300 of FIG. 3, the packets may include the associated GPS time tags. These packets may then be assembled for transmission 345/451. If the TSSP node 120 is communicating via a communication interface 150 that does not employ streaming data 350/454, the sensor 210 may be operating such that a threshold must be exceeded by the sensor output before transmitting the packet. In this case, the processor 250 may examine the sensor 210 digital data and perform a maximum value comparison of the maximum individual sensor data values in a packet relative to a threshold value 355/457. If no sensor 210 within the TSSP node 120 has a value exceeding the threshold, the packet may be dropped 360/460, and the processor 250 may await the next digitized sensor output 340/448. If one sensor 210 data value exceeds the threshold, or if a streaming data mode is being employed 350/454, then the packet may be time tagged 365/463. In the method 300 of FIG. 3, the position data determined by the GPS receiver 220 may also be added to the packet 365. This packet may then be communicated 370/466 by the data interface 260 to the processor platform 110. After transmission, the TSSP node 120 may await the next digitized sensor output 340/448.

To insure coherent system 100 processing accuracy, the processor platform 110 may arrange data gathered by the sensors 210 from each TSSP node 120 into a raw sensor data file. The sensor data file may include associated sampling rate data, time of the first data item relative to an epoch, and/or the total time in cycles of a previous epoch. The data may be aligned by the processor platform 110 from the raw sensor data. The raw data samples may be used to extrapolate or curve fit sensor output into a desired time reference standard (e.g., GPS time, clock master epoch time, or any other reference frame), which may be user defined. The extrapolation may utilize linear interpolation between different data points, for example, or any other curve fitting solution (parabolic, cubic, etc.) approach. With the sensor data extrapolation, the user may be able to time shift the data in any desired way to perform coherent combining or direction finding of sensor output over an array.

Another coherent processing approach may be employed for measurements collected near the beginning of the time interval when the PPS strobe signal occurs for GPS operations or the master TSSP node 120 impulsive signal transmits for non-GPS operations. Instead of employing the interpolation algorithm to convert the data into a common time frame, the raw data may be utilized for a short coherent processing interval. This interval may be limited by relative oscillator drift across the array 130 of TSSP nodes 120 and/or by the highest bandwidth signal that the sensors 210 within the array 130 may process. The phase shift of the highest frequency of sensor operation may not exceed 180 degrees for coherent processing. As a result, the coherent processing interval from the beginning of the synchronization cycle may be limited to the time when a maximum TSSP node 120 clock count minus a minimum TSSP node 120 clock count is less than one half the clock counts of the highest operational frequency of sensor signal processed in the array 130. Thus, low drifting clocks may permit high bandwidth sensor operation and long coherent processing intervals. When the individual sensors 210 perform the detection processing, this coherent processing interval may not apply.

With either synchronization approach (with or without GPS), the system 100 may be able to achieve microsecond level synchronization accuracy. Accuracy may depend upon a GPS PPS strobe output accuracy, a master clock unit accuracy, a clock cycle increment, and/or individual TSSP node 120 internal variations of times to register the impulsive event and to record sensor 210 data. At a microsecond level of accuracy, it may be possible to support distributed acoustic arrays to determine direction of arrival of sounds and extend the range to detect sounds, for example. Microsecond accuracy may also support radio frequency sensor operation to determine angle of arrival against narrowband radio signals. The TSSP nodes 120 may be configured to transmit continuous streams of sensor data or data packet bursts when characteristics of the incoming sensor data meet specified threshold criteria.

Data Streaming Application

As an example of a data streaming application, TSSP nodes 120 with audio microphone sensors 210 may be placed along a line in a small array 130 or piconet and may interface with a processor platform 110 such as a smartphone. If the TSSP node 120 spacing is one meter, for example, then the TSSP nodes 120 may be used to create an audio beam forming sensor array 130 for operation over an acoustic band in the 60-220 Hz frequency range. The audio detected by each microphone 210 may be collected and preprocessed in the TSSP nodes 120 with digital signal processing and then sent to the host processor platform 110 over the available communications interface 150. The processor platform 110 may run an application that collects all TSSP acoustic sensor data to digitally beam form an array lobe using the timing data to phase align the acoustic lobe direction relative to the array line. With this directional lobe, it may be possible to first detect and then track and locate a sound source, such as a vehicle, that has audio emissions in this band. Different TSSP node 120 spacing may allow for different acoustic bands of operation to perform tracking and locating functions of other acoustic signatures such as unmanned air vehicle engine and propeller noise.

Acoustic Detection Application

In a packet burst mode, audio detected using microphones 210 may be processed in real time on the TSSP node 120 to write a data packet when a microphone 210 in the array 130 detects a specific type of signature. One example of a specific signature may be the sharp impulsive crack that results from the supersonic shock wave of a bullet passing nearby. When this signature is detected, a data packet can be generated. Next, a second related signature type can be processed from sound detected by the microphone 210 when the report from the gun firing is detected. This sound may have a unique but different signature compared to the sound of a bullet passing nearby. When either of these signatures is detected, the sound may be identified and time stamped. Then the processor 250 may packetize this data, and the wireless interface 260 may transmit the packets to the processing platform 110. This operation may be repeated by other TSSP nodes 120 in the array 130 that detected the same types of signatures. An application hosted on the processing platform 110 can then use the acoustic data type, time data, and location data from multiple TSSP nodes 120 to determine the direction or path of the bullet from the along with estimated range of the shot to locate the position of the shooter.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above examples are presented in the context of TSSP nodes 120 connecting to a central processing platform 110 with wireless communication service 150, it will be understood that the systems and methods described herein can be performed by any interconnected computers (e.g., instead of a single processor platform 110, etc.). Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A sensor system comprising:
   a sensor configured to detect an environmental condition and produce a sensor signal in response;
   a receiver configured to receive a signal comprising a time reference having a first frequency;
   an oscillator configured to produce a precision time reference signal having a second frequency that is higher than the first frequency;

a processor in communication with the sensor, the oscillator, and the receiver, the processor configured to generate a time stamp using a combination of the time reference and the precision time reference signal and package data from the sensor signal with the time stamp to generate packaged data; and a data interface in communication with the processor, the data interface configured to transmit the packaged data over a network.

2. The sensor system of claim 1, wherein the sensor comprises a microphone, a radio receiver, an infrared detector, a magnetometer, and/or a video camera.

3. The sensor system of claim 1, wherein the receiver comprises a global positioning system (GPS) receiver in communication with the processor, the GPS receiver configured to determine a location of the sensor.

4. The sensor system of claim 3, wherein the oscillator is a component of the GPS receiver.

5. The sensor system of claim 3, wherein:
the first frequency is a GPS strobe frequency; and
the GPS receiver is configured to output a determination of the location of the sensor at the GPS strobe frequency.

6. The sensor system of claim 3, wherein the processor is further configured to package the location of the sensor with the data from the sensor signal and the time stamp to generate the packaged data.

7. The sensor system of claim 1, wherein the time stamp generated using the precision time reference signal has a microsecond level accuracy.

8. The sensor system of claim 1, wherein the data interface is configured to transmit the packaged data over a Bluetooth, Zigbe, and/or WiFi network.

9. The sensor system of claim 1, wherein the processor is configured to generate the time stamp by interpolating the time reference with the precision time reference signal.

10. The sensor system of claim 1, wherein the processor is configured to generate the time stamp by:
receiving the time reference from the receiver;
counting cycles of the precision time reference signal generated over a period of the time reference from the receiver to generate a cycle count;
receiving the sensor signal from the sensor;
dividing the cycle count at the time of the receiving of the sensor signal by a known time reference cycle total to generate a fraction; and
multiplying the time reference period by the fraction to generate the precision time reference signal.

11. The sensor system of claim 1, wherein:
the sensor comprises the receiver; and
the receiver is configured to receive the signal comprising the time reference by the sensor detecting an impulsive signal.

12. The sensor system of claim 11, wherein:
the sensor comprises a transmitter; and
the impulsive signal is generated by the sensor comprising the transmitter.

13. The sensor system of claim 1, further comprising:
a second sensor package comprising:
a second sensor configured to detect an environmental condition and produce a sensor signal in response;
a transmitter configured to transmit the signal comprising the time reference having a first frequency;
a second oscillator configured to produce a precision time reference signal having a second frequency that is higher than the first frequency;
a second processor in communication with the second sensor, the second oscillator, and the transmitter, the second processor configured to generate a time stamp using a combination of the time reference and the precision time reference signal and package data from the sensor signal with the time stamp to generate second packaged data; and
a second data interface in communication with the second processor, the second data interface configured to transmit the second packaged data over the network.

14. The sensor system of claim 13, wherein:
the transmitter is configured to transmit the signal comprising the time reference by generating an impulsive signal.

15. The sensor system of claim 14, wherein the transmitter comprises a speaker, a radio transmitter, and/or an infrared light emitting diode (LED).

16. The sensor system of claim 1, further comprising:
a central processing platform comprising:
a central data interface configured to receive the packaged data; and
a central processor in communication with the central data interface.

17. The sensor system of claim 16, wherein the sensor, the receiver, the oscillator, the processor, and the data interface form a first sensor package, the sensor system further comprising a plurality of the first sensor packages.

18. The sensor system of claim 16, further comprising:
a second sensor package comprising:
a second sensor configured to detect an environmental condition and produce a second sensor signal in response;
a transmitter configured to transmit the signal comprising the time reference having the first frequency;
a second oscillator configured to produce a second precision time reference signal having a third frequency that is higher than the second frequency;
a second processor in communication with the second sensor, the second oscillator, and the transmitter, the second processor configured to generate a second time stamp using a combination of the time reference and the second precision time reference signal and package data from the second sensor signal with the second time stamp to form second packaged data; and
a second data interface in communication with the second processor, the second data interface configured to transmit the second packaged data over a second network.

19. The sensor system of claim 18, wherein:
the sensor, the receiver, the oscillator, the processor, and the data interface form a first sensor package, the sensor system further comprising a plurality of the first sensor packages;
at least one of the first sensor packages further comprises a first GPS receiver in communication with the processor of the at least one first sensor package, the first GPS receiver configured to receive a first GPS time signal;
the second sensor package further comprises a second GPS receiver in communication with the second processor, the second GPS receiver configured to receive a second GPS time signal;
the processor of the at least one of the first sensor packages comprising the first GPS receiver is further configured to package the first GPS time signal with the data from the sensor signal and the time stamp to generate the packaged data; and the second processor is further configured to package the second GPS time signal with the data from the second sensor signal and the second time stamp to generate the second packaged data; and the central processor is configured to receive the packaged data and the second packaged data.

20. The sensor system of claim 18, wherein the transmitter comprises a speaker, a radio transmitter, and/or an infrared light emitting diode (LED).

21. The sensor system of claim 18, wherein:

the central data interface is configured to receive the second packaged data; and the central processor is configured to correlate the packaged data and the second packaged data based on the time stamp and the second time stamp.

22. The sensor system of claim 21, wherein the time stamp and the second time stamp are synchronized to compensate for a difference in transmission times for transmissions between the data interface and the central processing platform and transmissions between the second sensor package and the central processing platform.

23. The sensor system of claim 21, wherein the central processor is further configured to analyze the correlated packaged data and second packaged data.

24. A method comprising:

detecting, with a sensor, an environmental condition and producing a sensor signal in response;

receiving, with a receiver configured to receive a signal comprising a time reference having a first frequency;

producing, with an oscillator, a precision time reference signal having a second frequency that is higher than the first frequency;

generating, with a processor in communication with the sensor, the oscillator, and the receiver, a time stamp using a combination of the time reference and the precision time reference signal and packaging data from the sensor signal with the time stamp to generate packaged data; and transmitting, with a data interface in communication with the processor, the packaged data over a network.

25. The method of claim 24, wherein the sensor comprises a microphone, a radio receiver, an infrared detector, a magnetometer, and/or a video camera.

26. The method of claim 24, wherein the receiver comprises a global positioning system (GPS) receiver in communication with the processor, the GPS receiver configured to determine a location of the sensor.

27. The method of claim 26, wherein the oscillator is a component of the GPS receiver.

28. The method of claim 26, wherein the first frequency is a GPS strobe frequency, the method further comprising:

outputting, with the GPS receiver, a determination of the location of the sensor at the GPS strobe frequency.

29. The method of claim 26, further comprising packaging, with the processor, the location of the sensor with the data from the sensor signal and the time stamp to generate the packaged data.

30. The method of claim 24, wherein the time stamp generated using the precision time reference signal has a microsecond level accuracy.

31. The method of claim 24, wherein the data interface is configured to transmit the packaged data over a Bluetooth, Zigbe, and/or WiFi network.

32. The method of claim 24, further comprising generating, with the processor, the time stamp by interpolating the time reference with the precision time reference signal.

33. The method of claim 24, further comprising generating, with the processor, the time stamp by:

receiving the time reference from the receiver;

counting cycles of the precision time reference signal generated over a period of the time reference from the receiver to generate a cycle count;

receiving the sensor signal from the sensor;

dividing the cycle count at the time of the receiving of the sensor signal by a known time reference cycle total to generate a fraction; and multiplying the time reference period by the fraction to generate the precision time reference signal.

34. The method of claim 24, wherein the sensor comprises the receiver, the method further comprising:

receiving, with the receiver, the signal comprising the time reference by the sensor detecting an impulsive signal.

35. The method of claim 34, wherein the impulsive signal is generated by a sensor package comprising a transmitter.

36. The method of claim 34, further comprising:

detecting, with a second sensor, an environmental condition and producing a sensor signal in response;

transmitting, with a transmitter, the signal comprising the time reference having a first frequency;

producing, with a second oscillator, a precision time reference signal having a second frequency that is higher than the first frequency;

generating, with a second processor in communication with the second sensor, the second oscillator, and the transmitter, a time stamp using a combination of the time reference and the precision time reference signal and packaging data from the sensor signal with the time stamp to generate second packaged data; and transmitting, with a second data interface in communication with the second processor, the second packaged data over the network.

37. The method of claim 36, further comprising:

transmitting, with the transmitter, the signal comprising the time reference by generating an impulsive signal.

38. The method of claim 37, wherein the transmitter comprises a speaker, a radio transmitter, and/or an infrared light emitting diode (LED).

39. The method of claim 24, further comprising:

receiving, with a central data interface, the packaged data.

40. The method of claim 39, further comprising:

detecting, with a second sensor, an environmental condition and producing a second sensor signal in response;

transmitting, with a transmitter, the signal comprising the time reference having the first frequency;

producing, with a second oscillator, a second precision time reference signal having a third frequency that is higher than the second frequency;

generating, with a second processor in communication with the second sensor, the second oscillator, and the transmitter, a second time stamp using a combination of the time reference and the second precision time reference signal and packaging data from the second sensor signal with the second time stamp to form second packaged data; and transmitting, with a second data interface in communication with the second processor, the second packaged data over a second network.

41. The method of claim 40, further comprising:
receiving, with a first GPS receiver in communication with the processor, a first GPS time signal;
receiving, with a second GPS receiver in communication with the second processor, a second GPS time signal;
packaging, with the processor, the first GPS time signal with the data from the sensor signal and the time stamp to generate the packaged data; and
packaging, with the second processor, the second GPS time signal with the data from the second sensor signal and the second time stamp to generate the second packaged data; and
receiving, with the central data interface, the packaged data and the second packaged data.

42. The method of claim 40, wherein the transmitter comprises a speaker, a radio transmitter, and/or an infrared light emitting diode (LED).

43. The method of claim 40, further comprising:
receiving, with the central data interface, the second packaged data; and
correlating, with a central processor in communication with the central data interface, the packaged data and the second packaged data based on the time stamp and the second time stamp.

44. The method of claim 43, wherein the time stamp and the second time stamp are synchronized to compensate for a difference in transmission times for transmissions between the data interface and the central processing platform and transmissions between the second data interface and the central processing platform.

45. The method of claim 43, wherein the central processor is further configured to analyze the correlated packaged data and second packaged data.

46. The sensor package of claim 18, wherein the network and the second network are the same network.

47. The method of claim 40, wherein the network and the second network are the same network.

* * * * *